United States Patent [19]
Duck

[11] Patent Number: 5,938,392
[45] Date of Patent: Aug. 17, 1999

[54] SPOOLED HAY DISPENSER

[76] Inventor: Bennie H. Duck, 1840 Lock 4 Rd., Lincoln, Ala. 35096

[21] Appl. No.: 09/037,755
[22] Filed: Mar. 10, 1998

Related U.S. Application Data

[60] Provisional application No. 60/040,179, Mar. 11, 1997.
[51] Int. Cl.⁶ ....................................... B66F 9/18
[52] U.S. Cl. ........................ 414/24.6; 414/24.5; 294/106
[58] Field of Search ................................ 414/24.5, 24.6, 414/111; 294/106

[56] References Cited

U.S. PATENT DOCUMENTS

| | | |
|---|---|---|
| 3,908,846 | 9/1975 | Brummitt . |
| 3,946,887 | 3/1976 | Parker ..................................... 414/24.6 |
| 4,008,862 | 2/1977 | Wilmes . |
| 4,049,140 | 9/1977 | Roose . |
| 4,687,402 | 8/1987 | Zatylny .................. 414/24.6 |
| 5,013,202 | 5/1991 | Love . |
| 5,281,068 | 1/1994 | Bruce . |
| 5,509,770 | 4/1996 | Burenga ................................. 414/24.6 |

FOREIGN PATENT DOCUMENTS

| | | | |
|---|---|---|---|
| 2337496 | 8/1977 | France ................................. 414/24.6 |

*Primary Examiner*—Dean Kramer
*Assistant Examiner*—Gregory A. Morse
*Attorney, Agent, or Firm*—Richard C. Litman

[57] ABSTRACT

A spooled hay dispenser apparatus for unrolling spooled hay from a tractor. The apparatus provides a slotted tube at the ends of and perpendicular to a cross bar for rotatably mounting spiked arms which hold a cylindrical hay bale. An upright locking bracket lets the operator pick up a roll of hay at the storage area, carry it to the feeding area, and completely unroll it without having to adjust the turnbuckle of the tractor's three point hitch at all. This bracket is of heavy construction design so as not to bend in use; this enhances the maintaining of control of the invention, even when handling uneven hay rolls (e.g., large on one end and small on the other). Also, the centered bracket on the cross bar maintains the arms horizontally when the bale is almost completely unrolled to prevent gouging the ground surface with the hexagonal bale holding plates.

9 Claims, 3 Drawing Sheets

SPOOLED HAY DISPENSER

CROSS REFERENCE TO RELATED APPLICATION

This application claims the benefit of U.S. Provisional Pat. application Ser. No. 60/040,179, filed Mar. 11, 1997.

BACKGROUND OF THE INVENTION

1. FIELD OF THE INVENTION

The present invention relates generally to an apparatus for unrolling spooled hay from a tractor. More specifically, the apparatus provides a slotted tube at the ends of and perpendicular to a cross bar for rotatably mounting spiked arms which hold a cylindrical hay bale. An important and innovative feature is an upright locking bracket which lets the operator pick up a roll of hay at the storage area, carry it to the feeding area, and completely unroll it without having to adjust the turnbuckle of the tractor's three point hitch at all. This bracket is of heavy construction design so as not to bend in use; this enhances the maintaining of control of the invention, even when handling uneven hay rolls (e.g., large on one end and small on the other). Also, the centered bracket on the cross bar maintains the arms horizontally when the bale is almost completely unrolled to prevent gouging the ground surface with the hexagonal bale holding plates.

2. DESCRIPTION OF THE RELATED ART

The relevant art of interest describes various apparatus for picking up, transporting and unrolling large cylindrical bales of hay. The pertinent art will be discussed in the order of perceived relevance to the present invention.

U.S. Pat. No. 4,008,862 issued on Feb. 22, 1977, to Raymond G. Wilmes describes a bale unrolling device comprising a tubular cross bar with perpendicular bracketed ends having apertures for inserting a locking pin. Two arms pivot within the brackets with a locking aperture on one end and a revolving spike in a bushing with a bearing cap at the opposite end. The arms pivot out for insertion into a hay bale and are locked in position by the locking pin. Folding of the device is accomplished by rotating in the arms. The tubular cross bar is attached to a pair of chains which converge in a V-shape and connected to a third chain to be pulled by a tractor or other towing vehicles. The device is distinguishable by its locking pins, revolving spikes and its non-requirement for hydraulic means for empowerment.

U.S. Pat. No. 5,013,202 issued on May 7, 1991, to Phillip W. Love describes an apparatus for picking up, transporting and unrolling large hay bales. The main frame is a multi-folding frame which pivots about its electric braking wheels and a hitch frame which connects the main frame to the towing tractor. The swing arms for holding a hay bale (with a diameter of up to 3 or 4 ft. and a length up to 5 or 6 ft.) are rotated in and out for releasing the bale. The mechanism for motivating the swing arms for holding and releasing the bales involves three push-pull members operating from a pivot block. The involved articulating structure is therefore distinguishable from the simple non-wheeled structure of the present invention.

U.S. Pat. No. 5,509,770 issued on Apr. 23, 1996, to Thomas I. Burenga describes a hay handler and unroller apparatus with an improved clamp and bracket design. A linear frame element has pivoting clamp arms at its ends held by brackets and a mount of a three-point hitch in the middle. Each of a pair of positioning devices for articulating the clamp arms vis-a-vis the frame consist of a push arm parallel to the frame element and perpendicularly and pivotally attached to a clamp arm at one end thereof. The opposite end of the push arm is pivotally attached to a one end of a cylinder pivot arm which passes through a U-shaped bracket on the rear of the frame element and is pivotally attached to a tab on the front of the frame element. The apparatus is able to maintain three positions by rotating the bracket 180° from its original position for holding three different lengths of hay bales. The apparatus is distinguishable for its omission of structural elements for maintaining each octagonal disc with two sharp triangular flanges extending therefrom from scratching the ground as the hay bale is almost completely unwound as provided for in the present invention by a protective element.

U.S. Pat. No. 3,908,846 issued on Sep. 30, 1975, to Roger Brummitt describes a bale handling apparatus comprising a rectangular vertical frame consisting of a pair of rectangular tubings supported by vertical cylindrical end members and intermediate flat bars. The ends of the rectangular vertical frame are pivotally connected to triangular shaped arms formed from the same rectangular tubing. The apex of the triangular shaped arms is reinforced with a gusset and support a square plate having four tines at its corners for holding a hay bale. The arms are motivated to open outward and close inward by a hydraulic ram and a link between the arms and parallel to the rectangular vertical frame. The vertical frame is connected by a three-point hitch to a tractor. Hay bales 6 ft. in diameter and 4–6 ft. long are handled by the apparatus. The multiple framing elements utilized in this apparatus are distinguishable from the simple singular armed and framed structure of the present invention.

U.S. Pat. No. 5,281,068 issued on Jan. 25, 1994, to Eldon H. Bruce describes a bale handling apparatus for loading, transporting and unrolling hay-bales weighing 800–1500 lbs., 4–6 ft. in diameter and 4–6 ft. in length. A yoked upper cross beam is pivotally hinged from a vertical U-shaped and curvilinear frame which is connected by a three-point hitch to a tractor. An upper cross beam is bent downwards and at its ends support two pivoting lift arms having 90° bends and circular bale engaging members with a centered prong. A controlling cable from the tractor passes through a pulley attached to the center of the upper cross beam to a pivotal link of the two lift arms. Pulling the cable causes the lift arms to come closer together for gripping a hay bale. Releasing the cable causes the lift arms to release the hay bale under the biasing force of springs connected between the ends of the upper cross beam and the curved portions of the lift arms. The apparatus is structurally distinguishable from the present invention for having a centered pivoting focal point rather than the paired pivoting foci and the lack of height control of the present invention.

U.S. Pat. No. 4,049,140 issued on Sep. 20, 1977, to Gerald L. Roose describes a bale carrying and unrolling device with a three-point hitch. A horizontal rectangular cross bar formed from two square cross-sectioned bars are joined at the ends by flat support bars with three mid-support braces. The ends of the upper horizontal bar have three apertures each for pivotally pinning the two arms. The outer ends of the arms have inwardly directed tines on a circular gripping plate. The arms are rotated out for releasing the hay bale by a hydraulic cylinder pivotally connected to one arm and having a rod element pivotally connected to two link members. One link member is pivotally connected to an extending plate having several apertures and mounted on the top and center of the cross bar adjacent the pair of extending plates (center hitch). The second link member is connected at an opposite end to a third link member which is pivotally connected to the other arm. The arms have mounting plates which are mounted in any of the three apertures for adjusting the arms to the length of a bale. It is unclear which mechanism raises and lowers the attached bale. The bale carrying and unrolling device is distinguishable from the present invention by the use of only one hydraulic cylinder and rod resulting in a different ancillary structure.

The foregoing descriptions of similar hay bale dispenser apparatus are incorporated herein by reference.

None of the above inventions and patents, taken either singularly or in combination, is seen to describe the instant invention as claimed. Thus, a spooled hay dispenser simple in construction which will maintain a minimum height to prevent gouging the turf is desired.

SUMMARY OF THE INVENTION

The present invention provides an apparatus for unrolling spooled hay from a tractor without the apparatus having to touch the ground at any time during the unrolling process. The apparatus provides a slotted tube at the ends of and perpendicular to a cross bar for rotating the spiked arms for holding a cylindrical hay bale. An upright and centered locking bracket lets the operator pick up a roll of hay at the storage area, carry it to the feeding area, and completely unroll it without having to adjust the turnbuckle of the tractor's three point hitch at all. This bracket is of heavy construction design so as not to bend in use; this enhances the maintaining of control of the invention, even when handling uneven hay rolls (e.g., large on one end and small on the other). Another advantage provided by the upright locking bracket centered on the cross bar is to maintain the arms horizontally when the bale is almost completely unrolled to prevent gouging the ground surface with the hexagonal shaped bale holding plates.

Accordingly, it is a principal object of the invention to provide a hay spool feeder which allows the hay to roll off flat without need of any adjustment to the upper link of the tractor's three point hitch by the operator.

It is another object of the invention to provide a spooled hay feeder/dispenser with a minimum number of parts, these being three separable parts for disassembly and storaging or transporting.

It is another object of the invention to provide a spooled hay dispenser with spiked arms automatically movable by hydraulic rods.

It is a further object of the invention to provide a spooled hay dispenser with a minimum height control for preventing the gouging of the ground by the apparatus when the bale is almost completely unrolled.

Still another object of the invention is to provide a spooled hay dispenser with a strong, rugged upper support locking bracket for attachment to the tractor's three point hitch It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
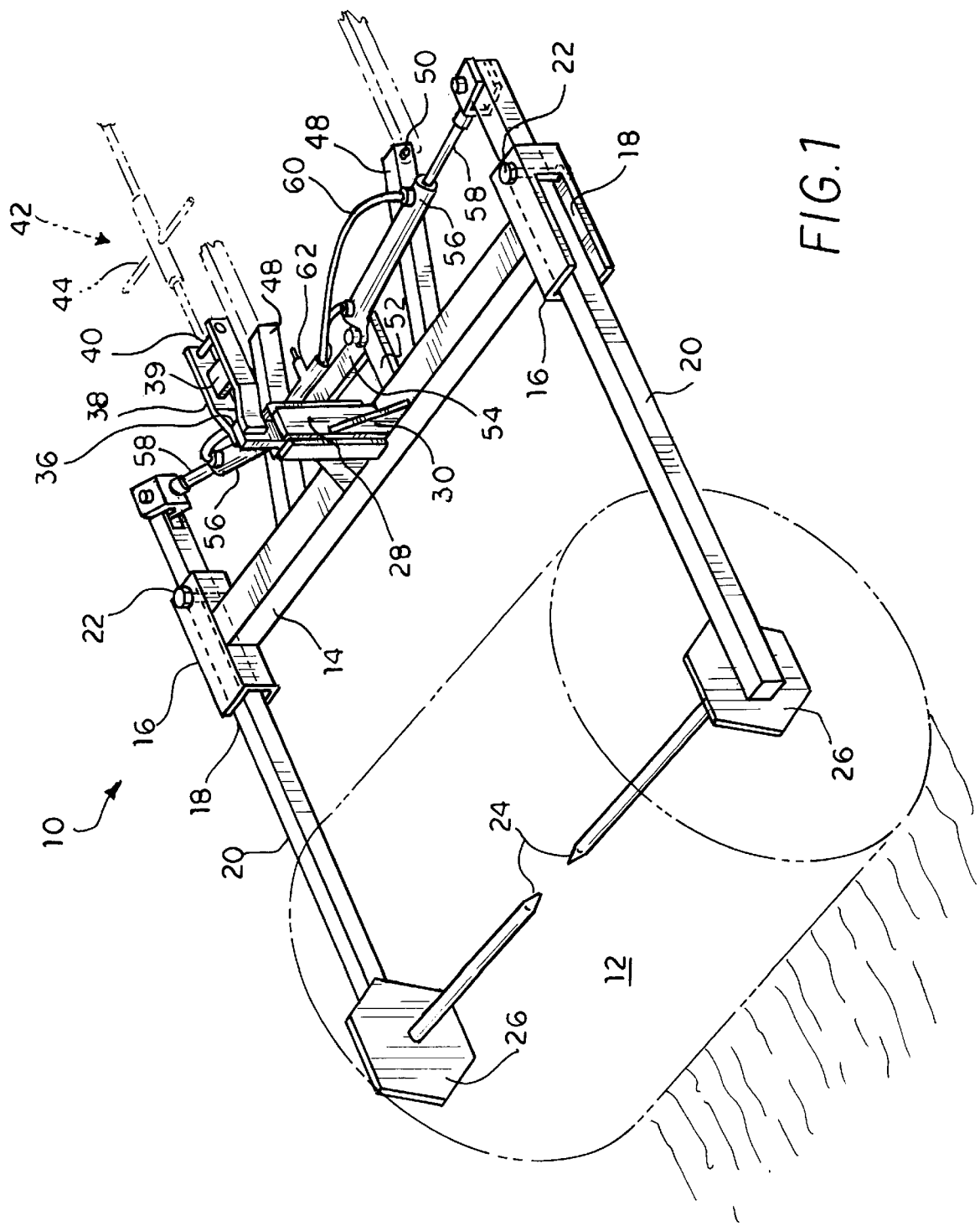
FIG. 1 is an environmental elevational view of a spooled hay dispenser apparatus being pulled by a tractor (not shown) to unroll a hay bale, and constructed according to the present invention.

In FIG. 1, the spooled hay dispenser/feeder apparatus 10 constructed in accordance with the principles of the invention, with an unrolling hay spool 12 shown in shadow. A tubular metal cross bar 14 with a square cross-section has a tubular metal bracket 16 with the same cross-section at each end affixed perpendicularly. Each bracket tube 16 has a slot 18 on an outer side surface extending from proximate the rear edge to the front edge. A pair of arms 20 consisting of metal tubes with a square cross-section slightly smaller than the inner cross-section of the slotted bracket 16 are each held in the bracket by a pivot pin 22 and can rotate out due to the slot 18. For adjustment of length of the arms 20 relative to the cross bar 14, at least two through bores (hidden) in each arm 20 are available for adjusting to bales 12 of different diameters. A spike 24 is attached perpendicularly to a rear end of each arm 20 with a bale guard plate 26 to hold in the hay spool 12 and to prevent the arms from sinking into the spooled hay.

The cross bar 14 has an innovative, upper support assembly which permits the operator to unroll a hay bale without need of any adjustment to the tractor's upper link. A pair of upright support plates 28, 28 form a bracket located in the center of bar 14 and on the top surface and supported by gussets 30. An upper locking pin 32 and a lower pivoting pin 34 are located across the plates 28. The lower pin 34 secures an upright, solid, pivot member 36, formed of bar stock with a back stiffener plate welded thereto as shown, which has almost an interference fit with the two plates 28 when member 36 is vertical. There is a U-shaped, 3-point hitch connecting bracket 38 at the upper end of member 36, arranged at a right angle thereto, and provided with a stiffening gusset 39 between the web forming the U. The bracket 38 has a pin 40 for securing the attachment means 42 (shown in shadow) comprising a turnbuckle 44 to the upper link of the three point hitch of the pulling tractor.

The cross bar 14 has a pair of downwardly angled hitch posts 48 with attachment pins 50 for the remaining elements to attach to the tractor. Between the hitch posts 48, a pair of short anchor posts 52 are positioned perpendicularly from the cross bar 14. Proximate the free ends of the anchor posts 52 a strut 54 strengthens the anchor posts for pivotal attachment to double action hydraulic cylinders 56, which are further pivotally attached at the rod ends 58 to the ends of the arms 20. One side of the necessary tubing 60 leading from the hydraulic cylinders 56 to a T-connector 62 for further connection to the hydraulic system means of the tractor is shown. The return tubing is partially shown, and it has its own T-connector (not shown) for connection to the tractor's hydraulics.

Figure 2:
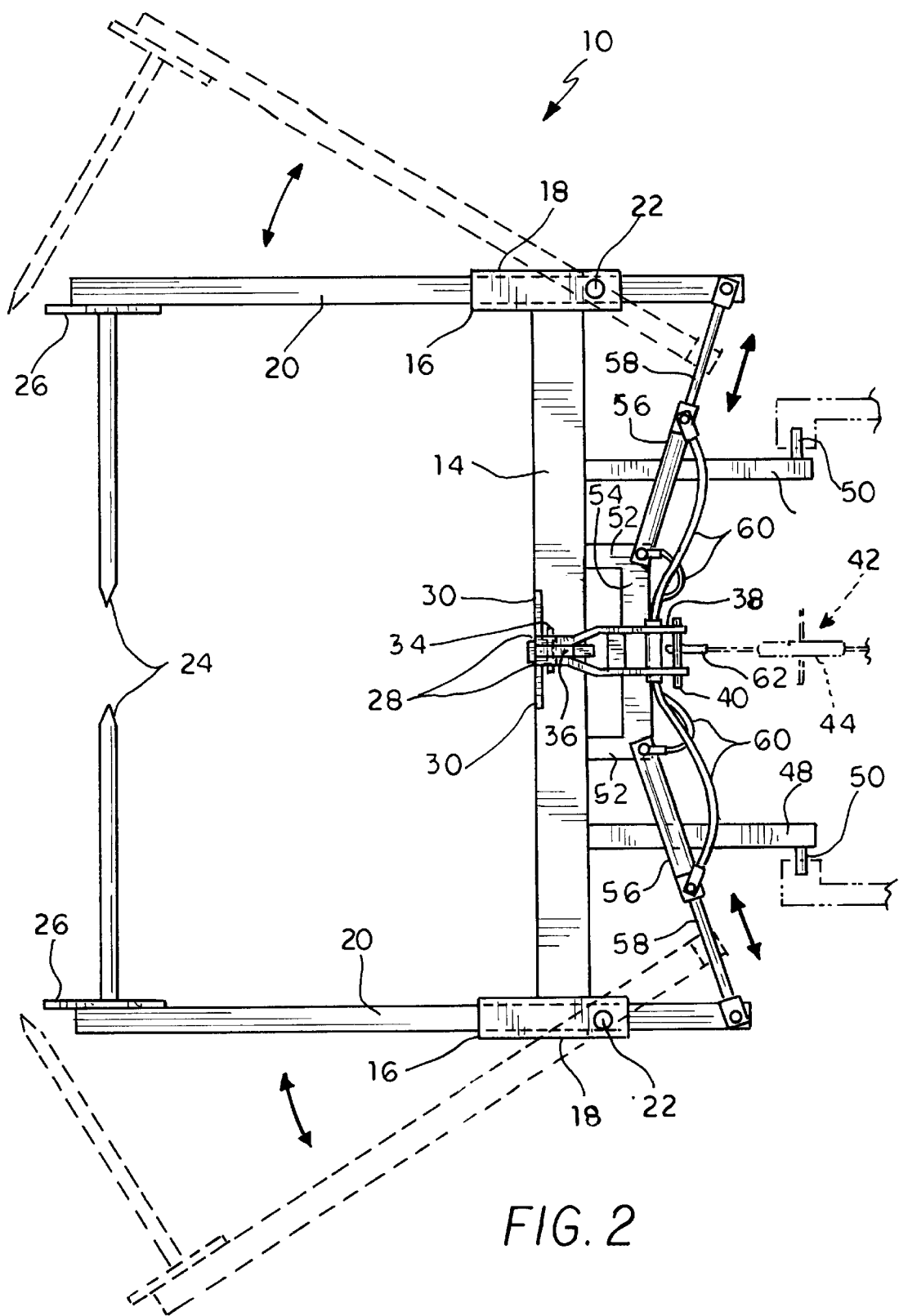
FIG. 2 is a top plan view of the spooled hay dispenser apparatus with the splayed, separated arms and tractor attachments in shadow.

In FIG. 2, the rotating movement of the arms 20 are shown with the outwardly extended positions of the arms indicated in shadow. The hydraulic cylinders 56 have been energized to pull in the arms 20 which pivot on pins 22 in the brackets 16 to rotate the rear portions of the arms 20 out through the slots 18. This action either permits the attachment to the hay spool 12 or the release of the hay spool. It is important to note here that the arms 20 are mounted forwardly (that is, toward the tractor) of the main beam 14 and this feature imparts yet additional strength to the invention.

Figure 3:
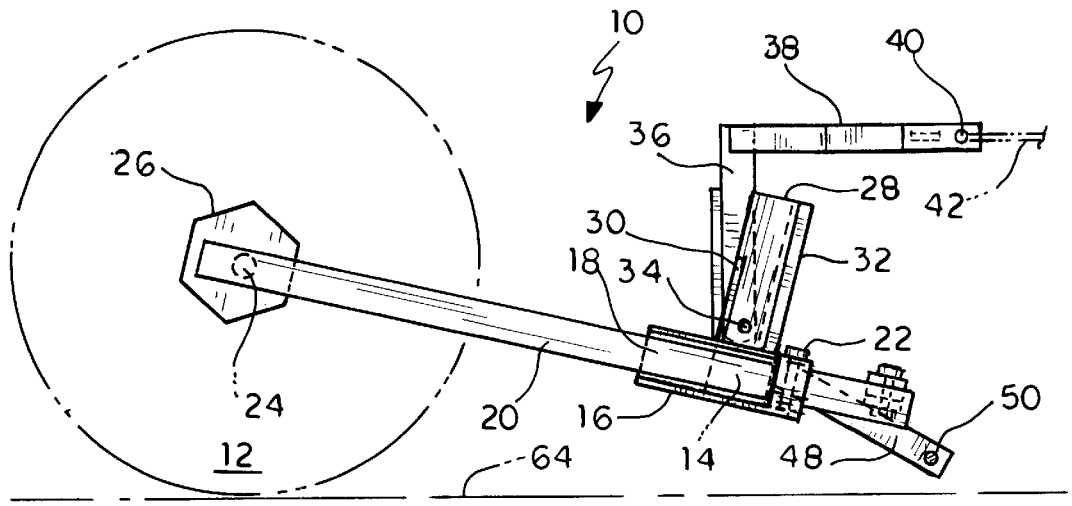
FIG. 3 is a left side elevational view of the spooled hay dispenser apparatus with the locking bracket device preventing any damage to the turf by the bale guard ends.
Figure 4:
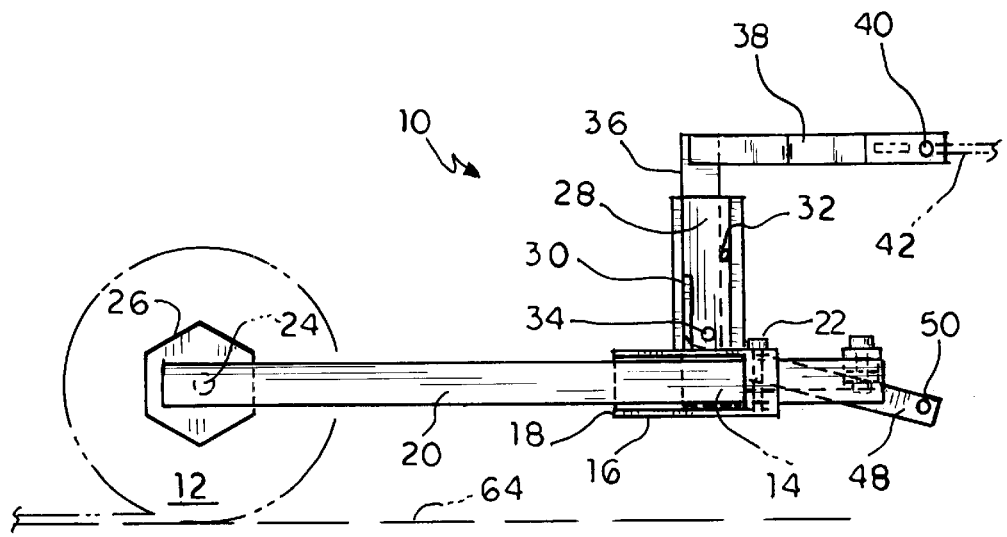
FIG. 4 is a left side elevational view of the spooled hay dispenser apparatus in the process of unrolling a hay bale in shadow.

FIGS. 4 and 3 illustrate, respectively, the unrolling of the hay spool 12 and the termination point of the unrolling process by utilizing the upper locking pin 32. The lower pivot pin 34 in the bracket 28 permits the rotation of the dispenser apparatus to accommodate a fresh hay spool 12. The main advantage of utilizing the present invention is the stability in height of the attachment means 42 vis-a-vis the ground surface 64 and the tractor. Another advantage lies in the fact that the upper locking pin 32 serves to prevent the bale guard plate 26 from scratching the ground surface 64. The hexagonal shape of the bale holding plate 26 affords another advantage in holding in different layers of the bale 12 for a better grip. It should be noted that the hexagonal configuration of the bale guard plate 26 is exemplary; it could be circular, for example.

The spooled hay dispenser apparatus 10 can be conveniently disassembled into three parts for transportation to and from the field and for storage. The two arms 20 can be removed from the cross bar 14 and the brackets 16 by removing the pivot pins 22.

Exemplary dimensions of key parts of the apparatus 10 are as follows: (1) Cross bar 14, 66 in. length, 4 in. square metal tube; (2) Two slotted brackets 16, 1 ft. length, about 3 and ½ in. square metal tubes, and these are custom-made; (3) Two arms 20, 52 in. length, 3 in. square metal tube; (4) Two hexagonal bale holding plates 26, 1 ft. diameter; (5) Two spikes 24, 20 in. length, 1.5 in. diameter; (6) Upright bar 36, 16 in. length, 3 in. width, 0.5 in. thickness; (7) Two brackets 28, 11 in. length, 4 in. width, 0.5 in. thickness; (8) U-shaped bracket 38, 17 in. overall length, with each bracket being 2 and ½ in. width, ½ in. thickness; (9) Two hitch posts 48, 14 and ¾ in. length, 3 in. square metal tube, spaced 29 in. apart and angled downwardly about 17 degrees from horizontal; and (10) Two hydraulic cylinders 56 and rod ends 58, 2 in. cylinder diameter, 8 in. stroke.

It is to be understood that the present invention is not limited to the embodiments described above, but encompasses any and all embodiments within the scope of the following claims.

I claim:

1. A spooled hay dispenser apparatus comprising:

a tubular cross bar having flat upper and front surfaces, ends and a center;

an upright bracket with two parallel sidewalls attached on said center and said upper flat surface of said cross bar;

there further being an upper locking pin and a lower pivot pin, said sidewalls of said bracket being joined by said upper locking pin and said lower pivot pin;

a pair of tubular slotted brackets, each attached perpendicularly to a respective one of said ends of said cross bar;

a pair of tubular straight arms with each arm having a forward end and a rear end and passing through each said slotted bracket;

a pin passing through each slotted bracket and each said arm adapted to pivot said arm within said slotted bracket;

pivoting means attached to each said forward end of said arm and adapted to pivot said arm outward;

a spike attached perpendicularly at said rear end of each arm; and a flat holding plate attached between said spike and said rear end of each said arm;

whereby said arms are rotated out of the slots by contracting said pivoting means to open said arms and subsequently extending said pivoting means to attach each said spike into a cylindrical spooled hay bale for unrolling hay to a minimum height above the ground.

2. The apparatus according to claim 1, wherein each said pivoting means comprise a hydraulic cylinder and a rod.

3. The apparatus according to claim 2, including a support structure attached to a forward surface of said cross bar by said upright bracket for attachment of each said hydraulic cylinder.

4. The apparatus according to claim 1, including an upright bar affixed perpendicular to said cross bar at one end and pivoting on said lower pivot pin of said bracket.

5. The apparatus according to claim 4, further comprising a U-shaped bracket, an upper end of said upright bar being affixed to said U-shaped bracket for attachment to the upper link of a tractor's three point hitch.

6. The apparatus according to claim 1, further comprising a pair of hitch posts attached to said front surface of said cross bar for attachment to a tractor.

7. The apparatus according to claim 1, wherein said holding plate is hexagonal in shape for holding in different layers of the unrolling hay bale.

8. The apparatus according to claim 1, said pair of arms having each a plurality of apertures for accommodating the pivot pin for adjusting said pair of arms to different sized bales.

9. The apparatus according to claim 1, wherein said apparatus is dimensioned and configured to be separable into three parts for assembly, disassembly, storage, and transporting.

* * * * *